Aug. 17, 1926.  
W. W. LA FARY  
TRAIN LINE AUTOMATIC COUPLING  
Filed Oct. 1, 1923  
1,596,275  
4 Sheets-Sheet 1
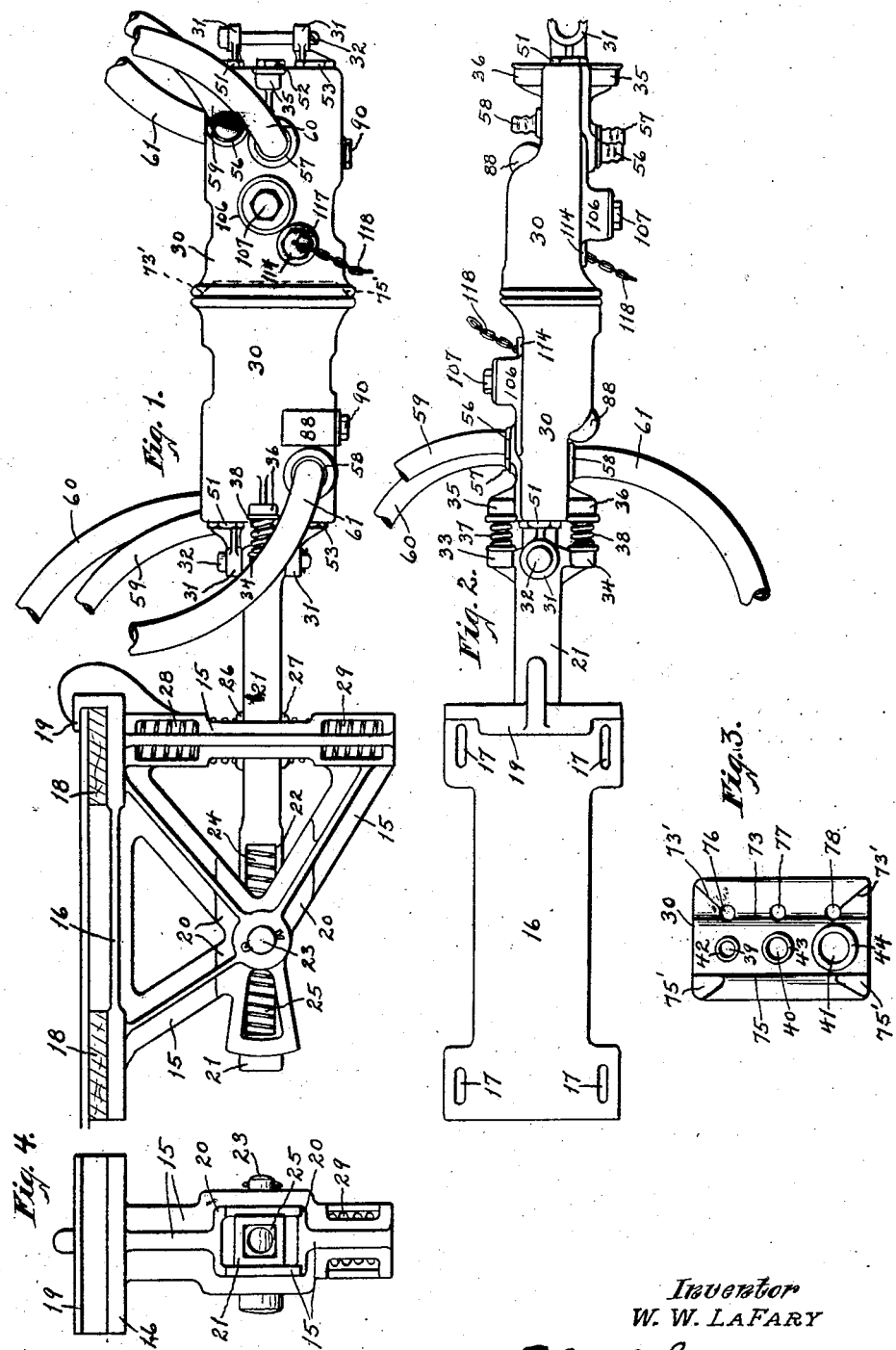
Inventor  
W. W. LaFary

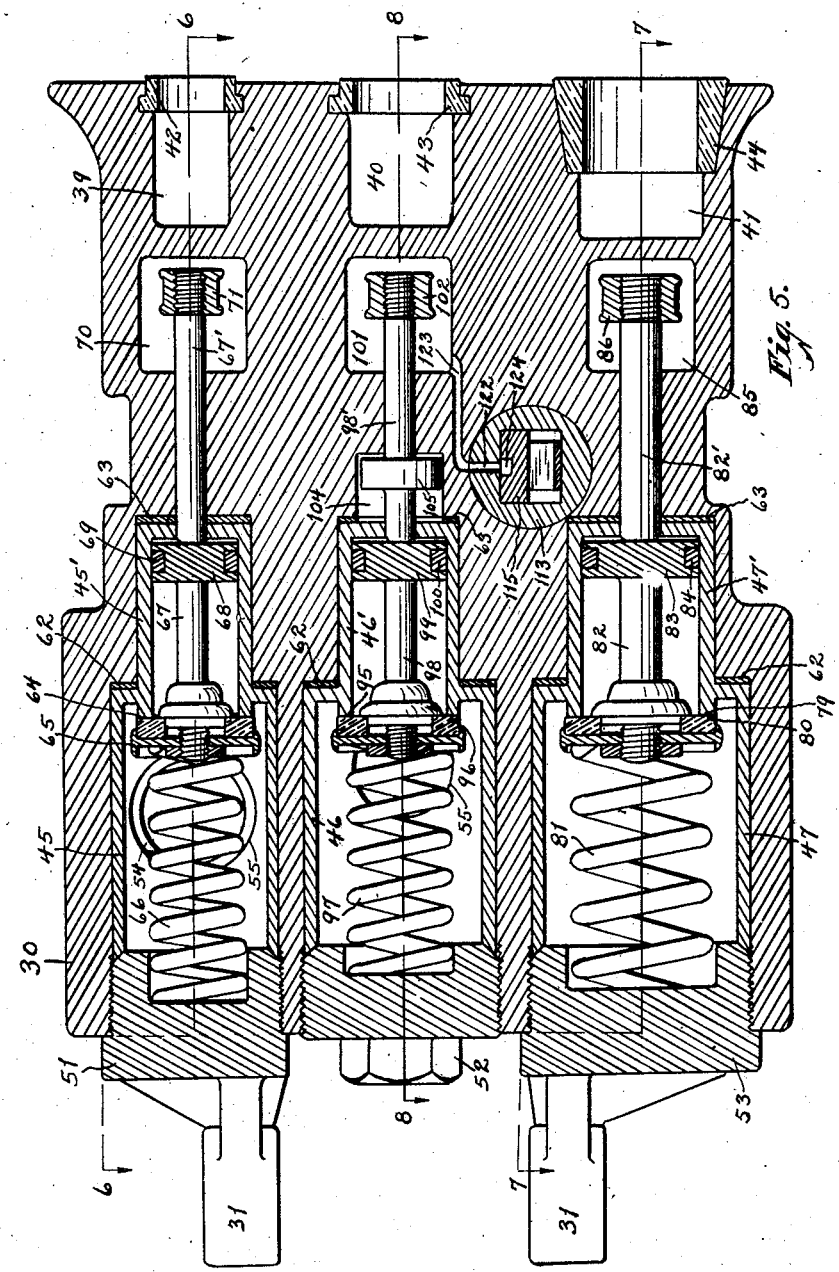

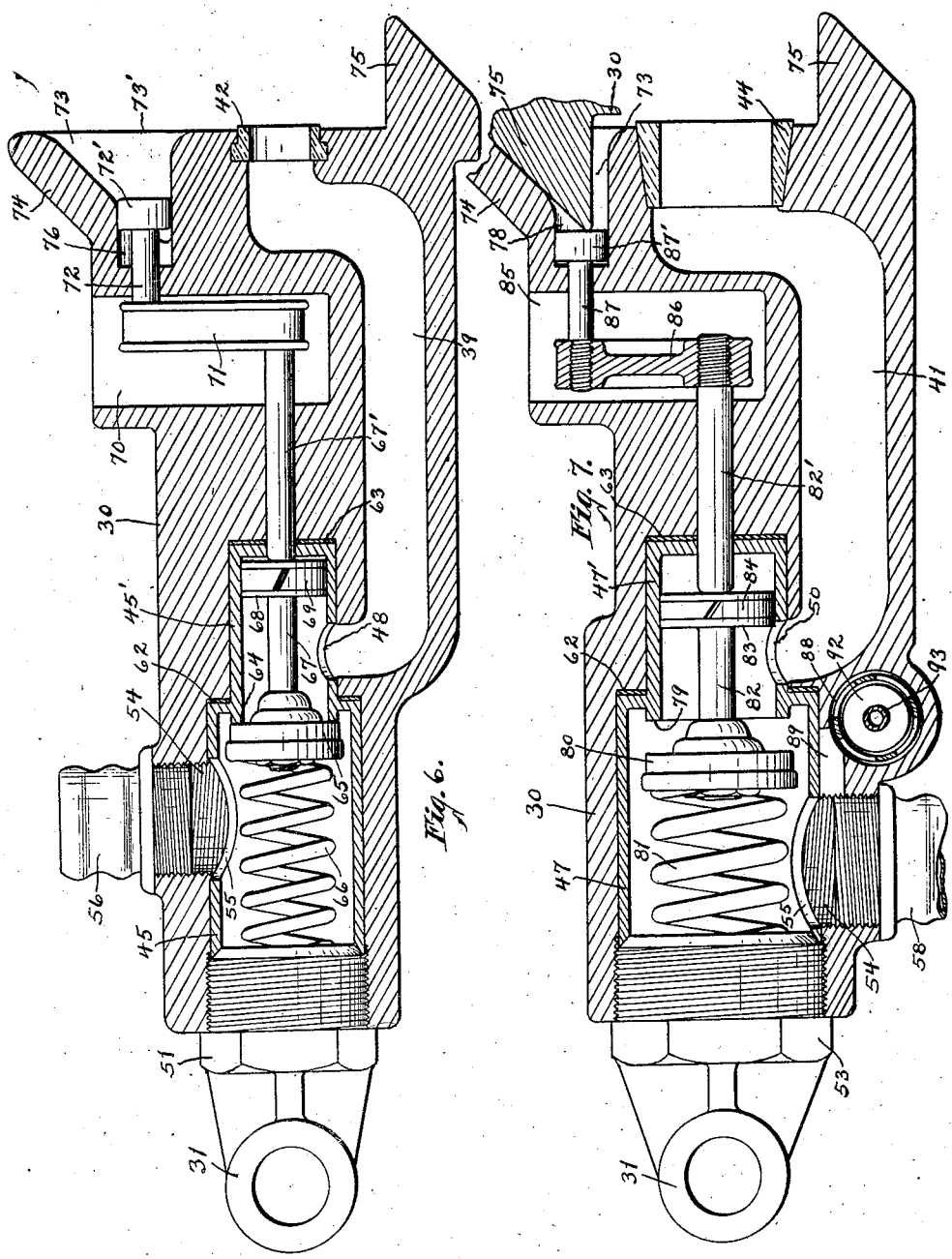

Aug. 17, 1926.
W. W. LA FARY
1,596,275
TRAIN LINE AUTOMATIC COUPLING
Filed Oct. 1, 1923  4 Sheets-Sheet 4
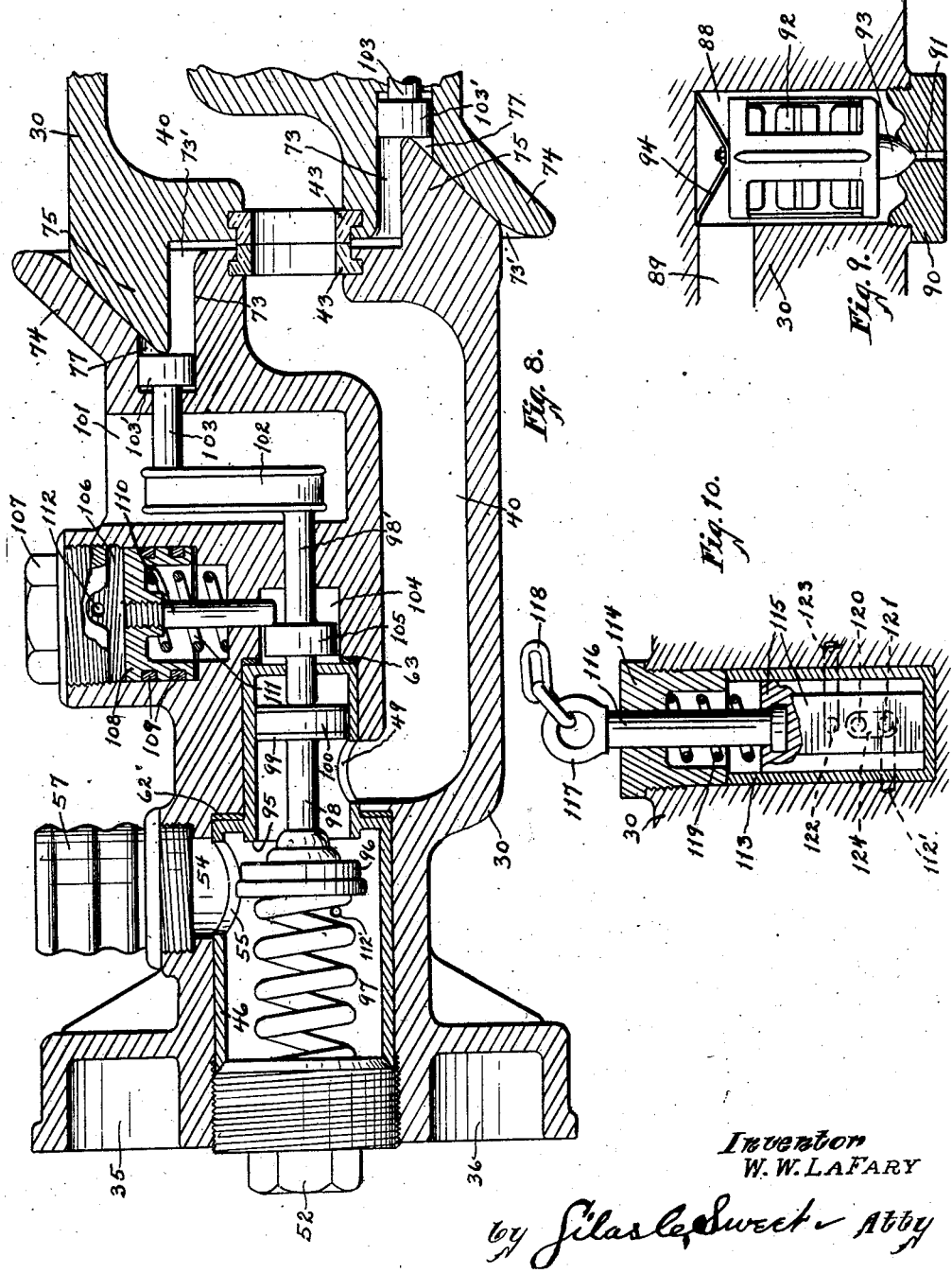
Inventor
W. W. LA FARY
by Silas e. Sweet Atty Patented Aug. 17, 1926.

1,596,275

UNITED STATES PATENT OFFICE.

WALTER W. LA FARY, OF DES MOINES, IOWA.

TRAIN-LINE AUTOMATIC COUPLING.

Application filed October 1, 1923. Serial No. 665,924.

The object of this invention is to provide means for automatically effecting a coupling of the fluid train lines simultaneously, thereby saving time, expense and injury or loss of life of the train men, by eliminating the necessity of their going between cars, the valves governing passage of the fluids being operated automatically.

A further object of this invention is to provide an improved coupler for fluid train lines in which valve-controlled conduits for passage of air for the brakes, air for signalling or control, and steam for heating purposes are combined in a single coupler head adapted to automatically make an operative connection with a mating head on another car by contact therewith, the valves being opened for passage of the fluids from one head to another automatically upon making such connection.

A further object of this invention is to provide means for combining a retaining valve with the automatic coupler, whereby when a train breaks accidentally instead of all the air pressure being lost only enough escapes to lower the pressure sufficiently to operate the triple valves and set the brakes, the remaining pressure being retained.

A further object of this invention is to provide means for combining an automatic drain valve for the steam line in an automatic combination fluid train-line coupling head.

A further object of this invention is to provide removable and replaceable valve housings which can readily be removed for repair and perfect members inserted in a short time, thus saving delays and expense.

A further object of this invention is to provide improved means for sealing the valve stems against leakage of fluid.

My invention consists in the construction, arrangement and combination of elements hereinafter set forth, pointed out in my claims and illustrated by the accompanying drawings, in which—

Figure 1 is a side elevation, partly in section, illustrating one of the improved coupler heads and the means for attaching it to a railway car, another mating coupler head being shown detached from its support and in operative connection with the first head. Figure 2 is a plan view of the members shown in Figure 1. Figure 3 is an end view of one of the coupler heads, taken at its free end. Figure 4 is a rear end view of the device, from the end opposite the coupler head. Figure 5 is a vertical section of one of the coupler heads on an enlarged scale, showing passages and valve housings for three fluid train-lines. Figures 6, 7 and 8 are longitudinal sections respectively on the lines 6—6, 7—7 and 8—8 of Figure 5. Figure 9 is a detail vertical section of an automatic drain valve adapted to be employed in connection with the steam line and located in the coupler head. Figure 10 is a detail vertical section of the retainer valve employed in connection with the air brake line.

The type of automatic coupling here shown and described is designed for use on passenger service and combines in one mechanism means for automatically connecting three fluid train-lines of adjacent cars, namely the air signal equipment, the air brake equipment and the steam line, the latter being located in the bottom of the head and having suitable connection with an automatic drain valve located in the head whereby condensates are removed. It is to be understood, however, that any desired number of fluid train-lines may be similarly connected and that certain of the elements may be omitted, particularly for freight equipment where the air signal and steam line are not employed. The coupling is interchangeable with the present type and is readily substituted therefor.

In the construction of the device as shown a suspension bracket 15 is employed which is generally triangular in side elevation and is formed with an integral horizontal plate 16 at its top, formed with slots 17 by means of which it may be bolted or otherwise secured to members 18 of a railway car, said members being suitably carried by the end sills, not shown. The plate 16 preferably is formed at its forward end with a hooked portion 19 embracing the foremost of the car members 18. The bracket legs or webs are bifurcated in their central portions to form yokes, the arms 20 of which straddle a draw bar 21 which is pivotally and slidably carried by said bracket. The draw bar 21 is formed with a longitudinal slot 22 in its rear portion and is pivoted on a transverse pin 23 carried by the rear portion of the bracket 15 and extending through said slot; and cushioning springs 24, 25 are mounted in said slot on opposite sides of and in impinging relation with said pivot and serve to balance each other and hold the draw bar in its normal position with respect to longitudinal movement but permitting such movement at times to a limited extent. The forward vertical member of the bracket 15 is vertically slotted throughout the major portion of its length and the draw bar 21 passes through such slotted portion and between plates 26, 27 mounted therein and backed by springs 28, 29, thereby centering the draw bar and holding it in its normal horizontal position yet permitting limited cushioned oscillation in a vertical plane on the pivot 23 at times.

A coupler head, designated generally by the numeral 30, is formed with vertically spaced apertured ears 31, 31 on its rear end and is pivotally connected to the forward end of the draw bar 21 by a pin 32 passing vertically through said ears and through said draw bar. The draw bar 21 is formed at its forward end with lateral sockets 33, 34 facing forwardly and the coupler head 30 is formed with similar rearwardly facing sockets 35, 36 on its opposite sides, and cushioning springs 37, 38 are located in the sockets 33—35 and 34—36 respectively and serve normally to hold the coupler head in alinement with the draw bar and yet permit limited lateral oscillation at times, particularly when the cars on which the devices are mounted are rounding a curve in the track. The various spring devices compensate for differences in height of cars to be connected, differences in distances between cars as determined by the car couplers, and for relative lateral movement of adjacent cars.

The coupler head 30 is formed, in the instance, with three vertically spaced, horizontally extending, longitudinal passages designated by the numerals 39, 40 and 41, which passages are laterally offset between their ends and open to the forward end of the coupler head in a vertical row substantially centrally of said head. The passages 39, 40 and 41 are adapted respectively, from top to bottom of the head, for compressed air for the signalling or control equipment, compressed air for operating the brakes, and steam for the heating system, and said passages are provided at their forward ends respectively with compressible gaskets 42, 43, 44 of annular form projecting slightly beyond the adjacent surface of the head, to assist in sealing the connection between these passages and similar passages in another head. At its rear end, or the end adjacent the draw bar, the coupler head 30 is formed, in this instance, with three vertically spaced cylindrical recesses, preferably on two or more diameters each, opening to its rear end and adapted to receive valve housings 45, 46 and 47 respectively, which are substantially coaxial with the forward ends of the respective passages 39, 40 and 41, and the rear ends of said passages communicate respectively with said housings by lateral openings 48, 49 and 50. The rear ends of the valve housings 45, 46 and 47 are closable by screw plugs 51, 52 and 53 screwed in the ends of the recesses of the head; and in this instance the apertured ears 31 are shown as formed on the heads of the plugs 51 and 53. Formed in the walls of the coupler head 30 are a plurality of ports 54 communicating with the interior of the valve housings, at their outer ends, by means of openings 55 in said housings when they are in place in the head; and nipples 56, 57, 58 are screwed into said ports and are adapted to receive connection of conduits or hose 59, 60, 61 forming parts, respectively, of the air signal line, air brake line and steam line of the train. The valve housings 45, 46, 47 are reduced in diameter at their inner ends to form cylinders 45', 46', 47', and said housings are mounted against gaskets 62, 63 mounted against the shoulders and inner ends of the recesses of the head, the gaskets 62, 63 being of annular form.

Referring particularly to Figure 6 and the valve mechanism for controlling the air signal device, an annular valve seat 64 is formed at the inner end of the valve body 45 where it communicates with the cylinder 45', and said seat is adapted to be closed by a disk valve 65 of suitable construction, said valve being backed and normally held to its seat by a spring 66 engaging said valve and the inner end of the screw plug 51. A valve stem is provided for the valve 65, which stem is preferably formed in two parts, 67, 67'. The valve is fixed to the outer end of the stem member 67, and formed on the inner end of said member is a piston head 68, provided with a sealing ring 69 seated in a peripheral groove, whereby said piston head and ring form a tight closure diametrically of the cylinder 45' and are adapted for longitudinal sliding movement therein. The other valve stem member, 67', is entirely separate from and is mounted in alinement with the member 67 and abutting at one end the piston head 68, said member 67' extending loosely and slidingly through the inner end of the cylinder 45', the gasket 63 and a portion of the wall of the coupler head closing the inner end of the recess in which the valve housing 45, 45' is mounted. The valve housing 45 with its cylinder 45' provides valve controlled communication between the port 54 through which air for the signal equipment enters the coupler head, and the passage 39 through which it leaves the same, the lateral opening or port 48 of said passage communicating with the cylinder portion 45' of said housing. Near its forward end the coupler head 30 is formed with a transverse recess 70 opening to one side thereof, and said recess is in the same horizontal plane as the recess containing the valve housing 45 and extends across the axis of said housing. The inner end of the valve stem member 67' projects within the recess 70, and fixed to the end thereof is a cross-head 71. Fixed to the cross-head 71 at a point spaced from the stem member 67', preferably by threading, is a push rod 72 which extends slidingly through the outer or forward wall of the recess 70 to the forward end of the coupler head, and is provided at its outer end with a head 72'.

At one side of the median line, the coupler head 30 is formed at its forward end with a vertical groove 73 substantially triangular in cross-section, the outer wall of said groove being formed by a sloping wing 74 on the end of the head. At the opposite side of the median line the coupler head is formed with a vertical rib or flange 75 adapted to enter the groove 73 of another coupler head similar to 30 and having a cross-sectional shape corresponding to that of the groove, the outer face of said rib or flange being inclined to cause it to engage the inner face of a wing 74 and be forced into the groove as the two coupler heads come together. Extending inwardly from the inner margin of the groove 73, at vertically spaced points, are guide holes 76, 77, 78, round in cross-section; and the push rod 72 projects within the uppermost hole 76 and its head 72' fits snugly to and is guided by the walls of said hole; the other guide holes, 77, 78 being used in a similar manner for other push rod heads.

Referring particularly to Figure 7 and the valve mechanism for controlling passage of fluid in the steam line, an annular valve seat 79 is formed at the inner end of the valve body 47 where it communicates with the cylinder 47', and said seat is adapted to be closed by a disk valve 80 of common form, said valve being backed and normally held to its seat by an expansive coil spring 81 engaging the outer face of said valve and the inner end of the screw plug 53. A valve stem is provided for the valve 80, which stem preferably is formed in two parts, 82, 82'. The valve is fixed to one end of the member 82 in a common and well known manner, and formed on the inner end of said stem member is a piston head 83 provided with a sealing ring 84 engaging the wall of the cylinder 47', whereby the piston and ring form a movable partition in said cylinder and prevent the passage of fluid beyond said piston. The valve stem member 82' is separate from and is mounted in axial alinement with the member 82 and abutting at one end the piston head 83, said member 82' extending loosely and slidingly through the inner end of the cylinder 47', a gasket 63 and a portion of the wall of the coupler head forming the inner end of the recess in which the valve housing 47, 47' is mounted. The valve housing 47 with its cylinder 47' provides valve controlled communication between the port 54 through which steam for the heating system enters the coupler head, and the passage 41 through which it leaves the same, the lateral opening or port 50 of said passage communicating with the cylinder portion 47' of said housing. Near its forward end the coupler head 30 is formed with a transverse recess 85 opening to one side thereof, and said recess is in the same horizontal plane as the recess containing the valve housing 47 and extends across the axis of said housing. The end of the valve stem member 82' projects within the recess 85 and fixed to such end portion, as by threading, is a cross-head 86. Fixed to the cross-head 86 at a point spaced from the stem member 82' is a push rod 87 which extends slidingly through the forward wall of the recess 85 and is provided at its outer end with a head 87' located in the guide hole 78 of the head 30. In connection with the valve mechanism for the steam line I have also shown a trap and automatic drain valve for the water of condensation, one form of which is shown in detail in Figure 9, as well as in Figure 7 where it is shown in position. The trap 88 is formed in and opens to the bottom of the coupler head 30, communicating at its upper end with the port 54 through which steam enters the head by means of a passage 89. The lower end of the trap 88 is closed by a screw plug 90 having a drain orifice 91 opening to the atmosphere and formed with a valve seat at the upper end of said orifice. The valve mechanism consists of a thermostatic element 92 to the lower end of which is fixed a valve 93 resting on the seat of the plug 90 and held thereto by means of a spring 94 on the upper end of said element engaging the closed upper end of the trap. The thermostatic element 92 has the characteristic of being expanded by the presence of live steam in the trap to the extent that the valve 93 is forced to its seat and the drain orifice 91 kept closed; but when water of condensation enters the trap to an appreciable volume, even when at the boiling point, the element 92 is contracted sufficiently to open the valve and permit the water to be blown out of the trap; and when the water has escaped the element is again exposed to the live steam and the valve is closed. Since the trap communicates with the valve housing 47 at its initial end, where the steam enters the head 30, the automatic draining function is operative both in uncoupled and coupled relation of the head, thus preventing freezing of water in the system in severe weather, even when the car on which the head is mounted is cut out of a train. It is to be understood that the particular construction of automatic draining means forms no part of my present invention, and any form suitable for this purpose may be employed; what I have done is to show the manner of combining such an automatic draining mechanism with the automatic coupling means for the steam line which I have here shown and described.

Referring particularly to Figure 8 and the valve mechanism for controlling passage of fluid in the air brake system, an annular valve seat 95 is formed at the inner end of the valve body 46 where it communicates with the cylinder 46', and said seat is adapted to be closed by a disk valve 96 of common form, said valve being backed and normally held in closed position by an expansive coil spring 97 engaging the outer face of said valve and the inner end of the screw plug 52. A valve stem is provided for the valve 96, which stem preferably is formed in two parts, 98, 98'. The valve is fixed to one end of the stem member 98 in any suitable manner, and formed on or fixed to the inner end of said member is a piston head 99 provided with a sealing ring 100 engaging resiliently the wall of the cylinder 46', whereby the piston and ring form a movable partition in said cylinder and prevent the passage of fluid beyond said piston. The valve stem member 98' is separate from and mounted in longitudinal alinement with the member 98 and abuts at one end the piston head 99, said member 98' extending loosely and slidingly through the inner end of the cylinder 46' and a portion of the wall of the coupler head beyond the inner end of the recess in which the valve housing 46, 46' is mounted. The valve housing 46 with its cylinder 46' provides valve controlled communication between the port 54 through which air under pressure for the brake system enters the coupler head, and the passage 40 by which it leaves the same, the lateral opening or port 49 of said passage communicating with the cylinder portion 46' of said housing. Near its forward end the coupler head 30 is formed with a transverse recess 101 opening to one side thereof, and said recess is in the same horizontal plane as the recess containing the valve housing 46 and extends across the axis of said housing. The end of the valve stem member 98' projects within the recess 101 and fixed to such end portion, as by threading, is a cross-head 102. Fixed to the cross-head 102 at a point spaced from the stem member 98' is a push rod 103 which extends slidingly through the forward wall of the recess 101 and is provided at its outer end with a head 103' located in the guide hole 77 of the head 30.

In operation the coupler heads are suspended by means of the brackets 15 in the manner shown and described, one at each end of the car to be equipped, and normally the free ends of the coupler heads project about three inches beyond the ends of the car couplers, not shown. When two cars come together and are connected in the usual way by means of the car couplers, the free ends of coupler heads 30 first engage in such manner that the flange 75 of each is guided into and enters the groove 73 of the other; and as said flanges approach the inner ends of the grooves they engage the heads 72', 87' and 103' of the push rods, moving said push rods inwardly of the coupler heads and with them the cross-heads 71, 86 and 102. Such movement of the cross-heads reciprocates the valve stem members 67', 82' and 98' which exert pressure against the pistons 68, 83 and 99 and open the valves 65, 83 and 96 against the pressure of the springs 66, 81 and 97, storing power in said springs; and so long as the cars are coupled and the coupler heads in engagement, the flanges or ribs 75 serve to hold said valves in open position, permitting passage of fluids to the cylinder portions of the respective passages 39, 40 and 41. The engagement of the free ends of the coupler heads 30 brings into registration the open ends of the several passages 39, 40, 41 of the respective heads, the projecting portions of the gaskets 42, 43 and 44 engaging, compressing and forming a fluid seal whereby fluid-tight communication is provided between the respective passages of the two heads. Thus automatically is established an operative communication between the air signal lines, air brake lines and steam lines of the two cars. The operative contact of the two coupler heads is maintained by action of the springs 24 and no latching arrangement is required; the springs 24 being compressed and put under tension when the coupler heads contact, because of the projecting relation of said heads relative to the car couplers. The connection between two coupler heads is illustrated in Figures 1 and 2, and the action of the flange 75 in the groove 73 is shown in Figure 8. When the cars are separated upon release of the coupling connections thereof, the flanges 75 disengage from the grooves 73, relieving pressure upon the push-rod heads, and the tendency is for the valves to close at once under spring pressure and prevent loss of fluid through the now open passages.

In the case of the air brake line, however, means is provided for delaying the closure of the valve until such time as the pressure has been reduced sufficiently to operate the triple valves of the system and set the brakes, after which said valve closes and prevents further loss of pressure. This is accomplished by a retaining valve, shown in Figure 8. A recess 104 is formed in the coupler head at the end of the recess containing the valve housing 46, and the valve stem member 98' passes through said recess 104 and is provided with a stop member 105 located in said recess. The head 30 is formed with a transverse cylinder 106 opening to one side thereof, and in line with the recess 104, the outer end of said cylinder being closable by a screw plug 107. A piston head 108, provided with sealing rings 109, is mounted for reciprocation in the cylinder 106, and projecting inwardly from said piston head is a piston rod 110 having its free end extending slidingly through a portion of the coupler head into the recess 104 and across the path of travel of the stop 105 at times. An expansive coil spring 111 is mounted in the cylinder 106 beneath and in engagement with the piston head 108 and tends to hold said piston head outwardly of the cylinder. Air under pressure is admitted to the outer end portion of the cylinder 106 by means of a bypass 112 leading from the valve housing 46 through the wall of the coupler head. When the valve 96 is closed the piston head 108 is held outwardly of the cylinder by the spring 111 and by engagement of the inner end of the stem 110 with the end of the stop member 105; and when the valve 96 is opened upon engagement of coupler heads as previously described, the stop is carried beyond the end of said stem 110. Air in the valve housing 46 and other parts of the system, usually maintained at about 85 pounds pressure, having entered the outer portion of the cylinder through the bypass 112, forces the piston head 108 inwardly against the spring 111, which is capable of resisting a pressure of only about 60 pounds, preferably. Such movement of the piston head carries the inner end of the piston stem 110 past the stop member 105 as shown, and prevents return movement or closing of the valve 96 by action of its spring 97. Thus when cars are separated the air brake passage 40 is left open, for a time, and fluid from the line exhausts to atmosphere and results in a reduction of fluid pressure in the line, such reduction being sufficient to operate the triple valve (not shown) of the system and set the brakes in a common and well known manner. This reduction continues to a point where the power of the spring 111 overcomes the pressure at the outer end of the cylinder 106, whereupon the piston is moved outwardly in said cylinder, carrying the stem 110 out of the path of the stop member 105 and permitting a closing of the valve 96 through action of the spring 97, thus stopping the loss of fluid pressure in the line, and retaining the remainder of the air pressure for use. This retaining valve mechanism, by delaying the closing of the valve in the air brake line, results in automatic setting of the brakes when the car is cut out, which function is particularly useful when a train accidentally breaks. It is also desirable to provide means for suspending, at times, the function of the retaining valve mechanism just described so that the brakes are not set when a car is uncoupled, particularly in the operation of switching. This suspension is accomplished by means of a manually operated slide valve mechanism shown in Figures 5 and 10. A valve casing 113 is mounted in a recess in the coupler head, which recess opens to one side of the head and is closable by a screw plug 114. A slide valve 115 is mounted for reciprocation in the casing 113 and is provided with a stem 116 which extends slidably through the plug 114 and is formed at its outer end with an eye 117 to which is attached a chain 118. An expansive coil spring 119 is mounted around the stem 116 in engagement with the slide valve and inner end of the plug 114, and tends to hold said valve inwardly of the casing as shown in Figure 10. The bypass 112, instead of leading directly from the valve housing 46 to the cylinder 106, goes through the valve casing 113 and is controlled by the slide valve 115. The valve casing 113 is formed with three ports in a row longitudinally thereof, the central port 120 (dotted lines Figure 10), being at one end of the bypass 112, while the innermost port 121 communicates with a bypass portion 112' leading from the valve housing 46. The outermost port 122 communicates with a bypass 123 leading to atmosphere, and is shown in Figure 5 as opening to the recess 101. The face of the slide valve 115 is formed with an elongated recess or connecting port 124, adapted to connect the central port 120 and either of the end ports 121 or 122 selectively. In its normal spring-held position inwardly of the casing, the valve port 124 connects the ports 120 and 121 and the bypasses 112' and 112, thus affording fluid communication between the valve housing 46 and cylinder 106 and permitting normal operation of the retaining mechanism hereinbefore described. When it is desired to suspend such function so that the brakes are not set when cars are uncoupled, a trainman manually pulls on the chain 118 of the coupler head in question, thus moving the valve 115 outwardly against the spring 119 and establishing communication through the valve recess or port 124 between the ports 120 and 122 and permitting fluid pressure in the bypass 112 and cylinder 106 to exhaust to atmosphere through the bypass 123. Thereupon the spring 111 immediately moves the piston head 108 outwardly in its cylinder, carrying the stem 110 out of range of the stop member 105 and permitting immediate closing of the valve 96 through pressure of the spring 97. The valve 96 is thus closed immediately upon uncoupling and the brakes are not set, and as soon as manual draft on the chain 118 is released the spring 119 acts to return the slide valve 115 to its normal position.

By means of this apparatus the fluid-train lines are valve-controlled in the coupler heads and are automatically and simultaneously coupled or connected when cars are coupled together, the valves being opened upon making such connection and closed when the connection is broken, with the further provision of setting the brakes by delayed closing of the air brake line, and the still further provision of suspending the delayed closing at times by manual operation. Also the steam line is provided with an automatic draining means in the coupler head.

The valve housings are removable for quick change and substitution, by removing the respective screw plugs 51, 52 and 53, the two-part valve stems permitting such removal without disconnecting any other parts. As the valve housings are held tightly against the gaskets 62, 63 by means of the screw plugs, and the valve stems 67, 98 and 82 are provided with piston heads having sealing rings, all danger of leakage of fluid from the valve housings around the stems is prevented. The valve disks employed are standard valves such as are in common use and can be easily replaced.

The flange or projection 75 of the head is formed with inclined cam faces 75' at its upper and lower ends adapted for engagement, when two heads come together, with oppositely inclined faces 73' at the upper and lower ends of the groove or depression 73 of the opposite head, whereby the heads are guided to position in a vertical plane and slight differences in the height of cars and coupler heads are compensated for.

I claim as my invention—

1. A train-line automatic coupling, comprising a coupler head formed with a depression and a projection spaced apart at its free end, said head being formed with a plurality of fluid passages opening to its free end, spring-pressed valves normally closing said fluid passages, valve-opening members slidably mounted in said head in operative engagement with the respective valves, projecting within said depression and adapted for simultaneous operation by contact of the projection of a complementary head entering said depression, and means for temporarily delaying the spring-actuated closing of one of said valves upon release of such contact.

2. A train-line automatic coupling, comprising a coupler head formed with a depression and a projection spaced apart at its free end, said head being formed with a plurality of fluid passages opening to its free end, spring-pressed valves normally closing said fluid passages, valve-opening members slidably mounted in said head in operative engagement with the respective valves, projecting within said depression and adapted for simultaneous operation by contact of the projection of a complementary coupler head entering said depression, and means for temporarily delaying the spring-actuated closing of one of said valves upon release of such contact, together with manually operated means for suspending the function of said delaying means.

3. A train-line automatic coupling, comprising a coupler head formed with a plurality of fluid passages opening to one end and adapted to aline with and form continuations of similar passages of a complementary head engaging therewith, said head being equipped with valve devices for closing said passages when such engagement is discontinued, said valve devices being automatically opened to permit passage of fluids when said heads are in engagement, and means for temporarily delaying the closing of one of said valves upon release of such engagement.

4. In a train-line automatic coupling, a coupler head formed with a passage for fluid and also formed with a recess, a valve housing mounted in said recess and having an outlet communication with said passage, said valve housing having an inlet communication with a train line, a spring-pressed valve device in said housing between said communications, a reciprocating member mounted in said head and extending within said housing and into engagement with said valve device, said reciprocating member being adapted for actuation when said head moves to coupled position to open said valve, said valve device including a piston head provided with a sealing ring in frictional sliding contact with the wall of said housing to prevent passage of fluid.

5. In a train-line automatic coupling, a coupler head formed with a passage for fluid and also formed with a recess, a valve housing mounted in said recess and having an outlet communicating with said passage, said valve housing having an inlet communicating with a train line, a spring-pressed valve in said housing between said inlet and outlet, a reciprocating member in said head adapted for actuation to open said valve when the head moves to coupled position, a stop member on said reciprocating member, said head being formed with a cylinder at right angles to said reciprocating member, a piston in said cylinder having a stem projecting at times across the path of said stop member and adapted to prevent closing of said valve under spring pressure, a bypass providing communication for fluid under pressure to the outer end of said cylinder, and a spring tending to move said piston and stem outwardly of said cylinder when fluid pressure therein has been reduced below a certain predetermined point.

6. In a train-line automatic coupling, a coupler head formed with a passage for fluid under pressure and also formed with a recess, a valve housing mounted in said recess and having an outlet communicating with said passage, said valve housing having an inlet communicating with a train line, a spring-pressed valve in said housing between said inlet and outlet, a reciprocating member in said head adapted for actuation to open said valve when said head moves to coupled position, a stop on said reciprocating member, said head being formed with a cylinder at right angles to said reciprocating member, a piston in said cylinder having a stem projecting at times across the path of said stop to prevent closing of said valve under spring pressure, a bypass providing communication for fluid under pressure to the outer end of said cylinder, a spring tending to move said piston and stem outwardly of said cylinder when fluid pressure therein has been reduced below a certain point, permitting said valve to close and stop reduction of pressure, and a valve device adapted for manual actuation to close said bypass at times and suspend the delaying function of said piston, stem and stop relative to closing of said spring-pressed valve.

Signed at Des Moines, in the county of Polk, and State of Iowa, this 17th day of August, 1923.

WALTER W. LA FARY.